(12) United States Patent
Hewson (10) Patent No.: US 8,542,686 B2
(45) Date of Patent: Sep. 24, 2013

(54) ETHERNET FORWARDING DATABASE METHOD

(75) Inventor: David Charles Hewson, Bristol (GB)

(73) Assignee: Gnodal Limited, Bristol (GB)

( * ) Notice: Subject to any disclaimer, the term of this patent is extended or adjusted under 35 U.S.C. 154(b) by 87 days.

(21) Appl. No.: 13/058,864

(22) PCT Filed: Aug. 12, 2009

(86) PCT No.: PCT/GB2009/001979
§ 371 (c)(1),
(2), (4) Date: Mar. 29, 2011

(87) PCT Pub. No.: WO2010/018374
PCT Pub. Date: Feb. 18, 2010

(65) Prior Publication Data
US 2011/0188503 A1 Aug. 4, 2011

(30) Foreign Application Priority Data
Aug. 13, 2008 (GB) .................................. 0814908.0

(51) Int. Cl.
*H04L 12/00* (2006.01)
(52) U.S. Cl.
USPC ......................... 370/392; 370/389; 370/401
(58) Field of Classification Search
USPC ............... 370/389, 390–392, 412, 401–403; 709/224–226, 229
See application file for complete search history.

(56) References Cited

U.S. PATENT DOCUMENTS

| | | | |
|---|---|---|---|
| 5,923,660 A | 7/1999 | Shemla et al. | |
| 6,381,601 B1 | 4/2002 | Fujiwara et al. | |
| 6,577,636 B1* | 6/2003 | Sang et al. | 370/395.7 |
| 6,735,198 B1* | 5/2004 | Edsall et al. | 370/389 |
| 6,772,163 B1* | 8/2004 | Sinclair et al. | 1/1 |
| 7,215,641 B1* | 5/2007 | Bechtolsheim et al. | 370/235 |
| 7,411,957 B2* | 8/2008 | Stacy et al. | 370/392 |
| 7,539,191 B1* | 5/2009 | Jacobson et al. | 370/392 |
| 7,619,983 B2* | 11/2009 | Panigrahy | 370/252 |
| 7,974,284 B2* | 7/2011 | Chen et al. | 370/392 |
| 8,189,576 B2* | 5/2012 | Ferguson et al. | 370/389 |
| 8,274,979 B2* | 9/2012 | Bragagnini et al. | 370/392 |
| 2002/0026438 A1 | 2/2002 | Rjaibi et al. | |
| 2004/0123024 A1 | 6/2004 | King | |
| 2004/0264464 A1* | 12/2004 | Wong | 370/390 |
| 2006/0039378 A1* | 2/2006 | Medina et al. | 370/392 |

OTHER PUBLICATIONS

International Search Report; mailed Mar. 3, 2010; Authorized Officer: Cristiana Lai.

* cited by examiner

*Primary Examiner* — Dang Ton
*Assistant Examiner* — Sai Aung
(74) *Attorney, Agent, or Firm* — Winstead PC (57) ABSTRACT

A technique is described for retrieving data from a hash table in an Ethernet bridge. The table has a plurality of columns, each of which has a hash function, thereby creating respective different hash key values.

20 Claims, 4 Drawing Sheets

ETHERNET FORWARDING DATABASE METHOD

The present invention relates to data processing, and in particular to the storage and retrieval of data using hash tables.

BACKGROUND OF THE INVENTION

A hash table is a technique for storing and retrieving data, which associates calculated index values with stored data. Hash tables are particularly efficient for data lookup operations, because they make use of index values that are efficient to search. In order to store a data value, a hash function is performed on a key value associated with the data value, thereby determining a hash value. This hash value is used as the index value to an entry in a table in which the data value is stored. The key value is also stored, in a location related to the entry used by the data value. For example, the key value may be stored in the same entry as the data value, or a pointer to another storage location may be stored with the data value.

In order to retrieve the data value, a query key value is subjected to the hash function, in order to determine the location in the table of the associated data value. The data value can then be returned. In some implementations, the query key value is compared with the stored key value in order to determine that the same key value was used to store the data value. If the key values match, then the data value is returned.

As an example of the use of a hash table, consider the storage of telephone numbers for contacts. The contact name is used as the key value, and the telephone number is the data value. In order to populate the storage table, the contact name is subjected to a hash function, and the resulting hash value used to indicate the table entry into which the contact name and associated telephone number are to be stored. In order to retrieve a telephone number, a contact name is submitted as a query key value, and is subjected to the hash function. The contact name and telephone number are retrieved from the table entry having the resulting hash value as an index value. The contact names are compared, and if they match, the telephone number is returned.

The table entry may be referred to as an entry, location or bucket, and each entry has a unique index value.

One particular use of a hash lookup table is in Ethernet networks for data packet forwarding. Ethernet is rapidly becoming the most commonly used data network for connecting computers and their peripherals together. Part of the attraction of Ethernet to network administrators is the ease of connecting and addressing these network attached devices or "end stations" as they are often called.

Figure 1:
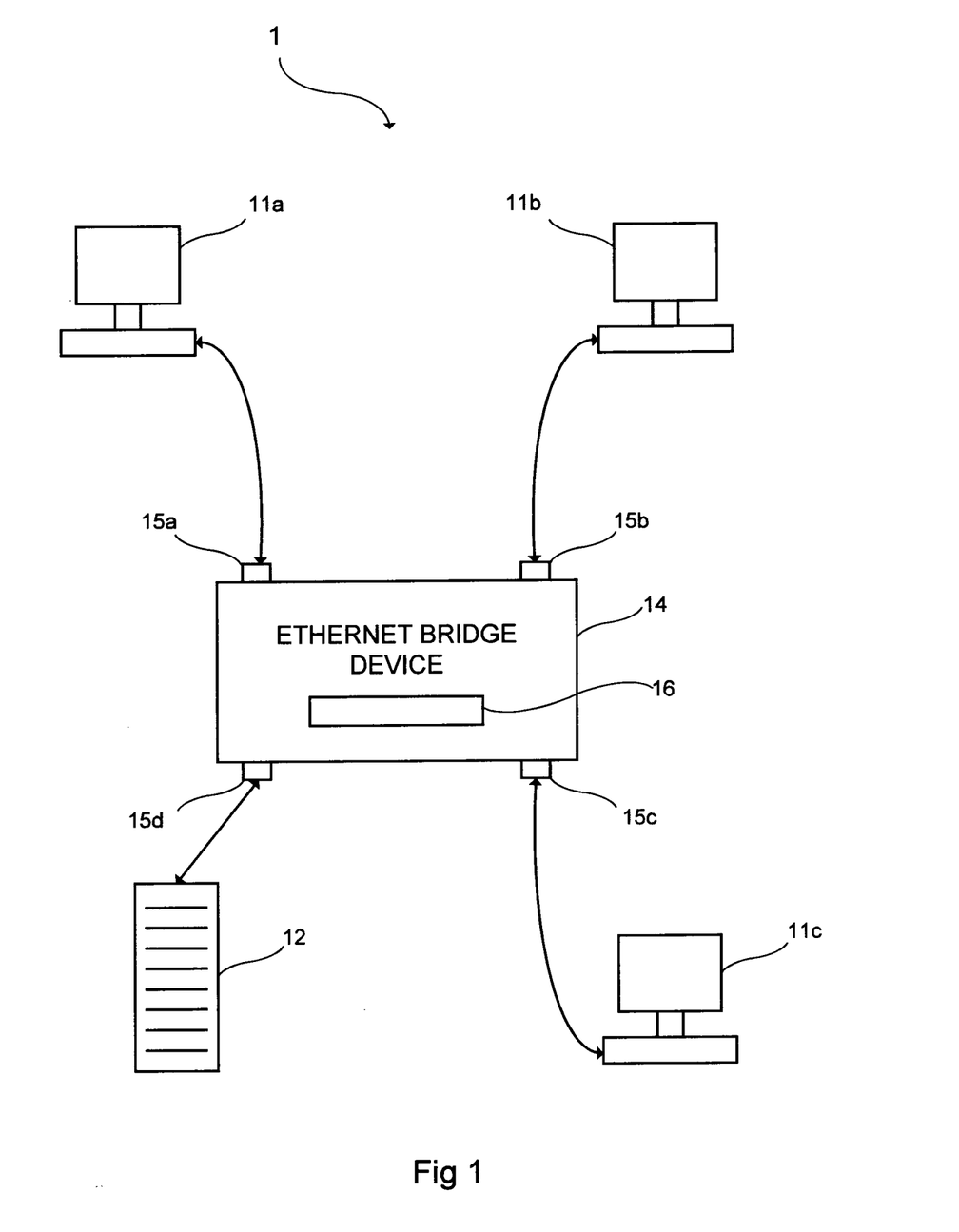
FIG. 1 illustrates a simple computer network.

FIG. 1 of the accompanying drawings is a block diagram illustrating a simple computer network. The network 1 includes a number of personal computers 11a, 11b, 11c and a server device 12, which communicate with one another using Ethernet communications via an Ethernet bridge 14. The Ethernet bridge device 14 includes a plurality of ports 15a, 15b, 15c and 15d, and a routing unit 16. The routing unit operates to route data packets (or "frames") between a source device and a destination device connected to ports of the bridge device 14.

Ethernet bridges have the capability to learn automatically the addresses of the End Stations they are connected to directly or via other Intermediate Stations or bridges which provide the interconnection between Ethernet network segments. The learning process is dynamic and performed automatically every time a bridge is powered up.

Figure 2:
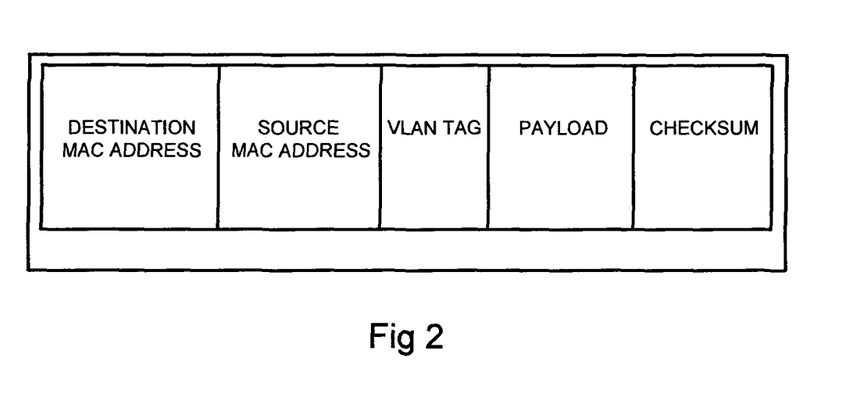
FIG. 2 illustrates an Ethernet data frame.

Ethernet data is encapsulated into Ethernet frames when it is sent between End Stations. A frame is illustrated in FIG. 2 of the accompanying drawings, and has a header containing a pair of End Station addresses used to direct the frame between a source and destination. Ethernet End Station addresses are defined by the IEEE 802 standard Medium Access Control (MAC) address space, each network attached device having a unique MAC address assigned during manufacture.

Commonly, the Ethernet bridge device 14 will also support multiple logical Ethernet network segments by utilising IEEE 802.1Q VLAN tagging whereby the MAC address is supplemented with a VLAN (virtual local area network) tag to indicate with which logical Ethernet network segment a particular frame is associated. The remainder of the frame consists of a payload (the data being transferred) and a CRC (cyclic redundancy check) for maintaining data integrity.

The Ethernet bridge device 14 contains a forwarding database which is used to route Ethernet frames from an ingress port of the bridge to the correct egress port of the bridge in order to deliver the frame closer to a destination End Station. In the simple example shown in FIG. 1, this results in data packets being delivered between personal computers and the server 12. In more complex network arrangements, the data packet is routed to the next bridge until the destination is reached.

This forwarding database uses the hash table technique described above and is populated as frames are routed through the bridge between Ethernet segments from which the network is constructed, joining end stations through intermediate points. When a frame is received by the bridge at a port (the ingress port for that frame), the bridge 14 learns the end station source details (MAC address, VLAN tag) for that frame, and maps those details to the port concerned. The mapping is stored in the forwarding database for subsequent use in routing, by subjecting the source details to the hash function of the forwarding database, and storing the port information in the table at the entry corresponding to the resulting index. Later incoming frames need to determine the egress link to which the frame is to be routed. The destination details of the frame (MAC address, VLAN tag) are used to determine the correct egress port by performing a hash lookup in the forwarding database.

The size and construction of the forwarding database must be carefully considered, since should it not be possible to lookup a port entry in the database, then the Ethernet bridge device 14 is required to route the frame to all other possible egress ports for that frame. Ideally, this only occurs before the forwarding database has learnt the MAC address of the source end station. However, if a subsequent MAC address requires storage in the same place in the forwarding database then it will displace the earlier address and lead to unnecessary flooding of frames.

When the hash function generates the same index for two different keys, then a hash conflict occurs and a mechanism is needed to resolve this. The probability of this occurring is dependent on the size of the hash table in comparison to the number of entries being held in it and how well the hash function distributes the keys amongst the slots of the hash table. As the hash table becomes more full, the probability of a hash conflict increases non-linearly.

Common mechanisms for handling hash conflicts are to form a list of conflicting entries attached to the hash table slot which is searched in some manner; to perform a second attempt with a different hash function or to have a content addressable overflow area. It is common for there to be some limit on the number of conflicts which can be handled either in total or for a particular hash entry.

In all cases it is highly desirable to keep the number of conflicting entries low and this means that the hash function should evenly distribute the entries across the hash entries. However there will always be pathological cases where all keys hash to the same hash value and the table is unable to handle that level of hash conflicts.

Since the distribution of MAC addresses is different when an Ethernet bridge is used in a different environment, it is unlikely that the hash function will always provide an optimal distribution to hash table entries and it is likely that the hash table will be effectively full (i.e. an entry being unable to be inserted) well before all hash entries in the table have been allocated.

SUMMARY OF THE INVENTION

Embodiments of the present invention may solve the problems of previously considered Ethernet routing techniques by providing a MAC address table comprising of multiple hash table columns each with an independent hash function, and usage count. There may also be provided a conflict resolution mechanism. The advantages of utilising multiple hash functions on respective hash columns of the forwarding database allows the utilisation of the table to be greatly increased, whilst still ensuring that a forwarding database lookup can occur in a single access to each hash table column concurrently. Respective hash functions for the hash table columns also ensure that it is highly unlikely that two different forwarding database entries which hash to a single entry on one column will also hash to a single entry on all of the other columns; this means that if all possible entries are allocated for a particular forwarding database entry, then it is likely to be able to relocate one of the already allocated entries onto a different column and hence create space for the new forwarding database entry.

Each hash table column maintains a count of the number of forwarding database entries which are stored in that column in an associated usage count. This value is incremented when an entry is inserted into the hash table column and decremented when an entry is deleted.

In one embodiment of the present invention, when end station information is inserted into the forwarding database, each hash table column generates its own independent hash value from the end station information and determines whether the associated entry in its table already exists for that end station information or is free. If an entry already exists for that end station, then the forwarding database entry is updated for that slot, otherwise if one or more entries are free, then the hash table column with the highest usage count is selected to have the forwarding database entry stored into its slot. If none of the entries in any of the hash table columns are free, then a conflict resolution method is invoked. The conflict resolution method selects the conflicting entry from each hash table column in turn determined using an algorithm based on the value of the usage count for each hash table column. For each of these conflicting entries the hash value is generated for the other hash table columns and the associated entry is accessed, if one or more of those entries is free, then the conflicting entry is relocated to the hash table column with the highest usage count and the count for that column is incremented, then the new entry is inserted into the now vacated slot. Should none of the entries be free, then the same method is applied recursively some number of times before moving to the next hash table column determined using the algorithm based on the value of the usage count. Should it not be possible to relocate any of the conflicting entries in this manner then a forwarding database conflict has occurred and needs to be resolved by one of the common methods for resolving these conflicts.

When the forwarding port corresponding to a destination end station is looked up in the forwarding database, each hash table column generates its own independent hash value from the destination information. The destination information is derived from the MAC address/VLAN tag, and these pieces of information may be combined in an appropriate manner. The hashed destination information is used to retrieve the corresponding data entry. Each column returning a data value then determines whether the entry has been matched with the destination information or not and if any entry matches then that column supplies the result. If none of the columns match, then a check is made on the end station information which is currently being inserted into the table. If it matches, than that information is used. Otherwise the lookup has failed and a miss occurs.

According to one aspect of the present invention, there is provided a method of routing Ethernet frames between ports of an Ethernet bridge device, the method comprising the steps of defining a routing table having a plurality of routing columns, each column having a plurality of entries, and each entry in a column having a unique index value, defining respective hash functions for the routing columns, receiving incoming address information from a port of the Ethernet bridge device, for each routing column: calculating a hash value from the incoming address information and the hash function defined for the column, and determining if an entry having an index value equal to such a calculated hash value is empty, for those routing columns having such an empty entry: determining a usage value based upon the number of entries in the column in which data are stored, and storing address and port information in the empty entry of the routing column having the highest usage value, the port information identifying the port of the Ethernet bridge device from which the incoming address information is received.

Such a method may also include, following the step of calculating a hash value, the steps of determining if an entry having an index value equal to such a calculated hash value already stores address information equivalent to the incoming address information, and, if so, updating port information held in that entry, the port information identifying the port of the Ethernet bridge device from which the incoming address information is received, and not storing address and port information in an empty entry of the routing table.

Alternatively, such method may also include, following the step of calculating a hash value, the steps of determining if an entry having an index value equal to such a calculated hash value already stores address information equivalent to the incoming address information, and, if so, not storing address and port information in an empty entry of the routing table, and determining if the port information stored at that entry identifies the port of the Ethernet bridge device from which the incoming address information is received, and, if not, updating port information held in that entry.

If none of the routing columns have such an empty entry, and none of the entries of the routing table already store information equivalent to the incoming address information, then such a method may comprise the steps of, for a first routing column, determining the respective hash values for the other routing columns for the address information corresponding to the port information stored in the entry having the index value equal to the calculated hash value, and determining whether any of the other routing columns has an empty entry for the hash value determined for that column, and, if so, transferring address and port information stored in the first routing column to the empty entry of the other routing column, and storing the address and port information in the entry of the first routing column having the index value equal to the calculated hash value, the port information identifying the port from which the address information is received.

These additional steps may be repeated for each routing column in turn until an empty entry is determined. The first routing column may be that routing column having the lowest usage value.

In order to route a data packet, the method embodying the present invention may further comprise the steps of receiving target address information as part of an Ethernet frame, calculating respective hash values for the routing columns from the target address information and the respective hash functions, determining a routing column having a non-empty entry having an index value equal to the calculated hash value for that column where the address information corresponding to the port information is the same as the receiving target address information, retrieving port information stored in the determined non-empty entry, and transmitting the Ethernet frame to the port or ports indicated by the retrieved port information.

In one embodiment, port information may only be retrieved from the determined non-empty entry if that entry also stores address information equivalent to the target address information.

According to another aspect of the present invention, there is provided a method of routing Ethernet frames between ports of an Ethernet bridge device, which defines a routing table having a plurality of routing columns, each column having a plurality of entries, and each entry in a column having a unique index value, respective hash functions being defined for the routing columns, the method comprising the steps of populating the routing columns with information relating the port or ports of the Ethernet bridge to address information, receiving target address information as part of an Ethernet frame, calculating respective hash values for the routing columns, from the target address information and the respective hash functions, determining a routing column having a non-empty entry having an index value equal to the calculated hash value for that column, and having address information equal to the target address information, retrieving port information stored in the determined non-empty entry, and transmitting the Ethernet frame to the port or ports indicated by the retrieved port information.

In an embodiment of such an aspect of the present invention, port information may only be retrieved from the determined non-empty entry if that entry also stores address information equivalent to the target address information.

According to another aspect of the present invention, there is provided an Ethernet bridge device comprising a plurality of ports for reception and transmission of Ethernet frames, a routing unit for directing an Ethernet frame received at an ingress port of the device to an egress port of the device, wherein the routing unit is operable: to define a routing table having a plurality of routing columns, each column having a plurality of entries, and each entry in a column having a unique index value, to define respective hash functions for the routing columns, to receive incoming address information from a port of the Ethernet bridge device, to calculate, for each routing column, a hash value from the incoming address formation and the hash function defined for the column, and to determine, for each routing column, if the entry having an index value equal to such a calculated hash value is empty, to determine, for those routing columns having such an empty entry, a usage value based upon the number of entries in the column in which data are stored, and to store address and port information in the empty entry of the routing column having the highest usage value, the port information identifying the port of the Ethernet bridge device from which the address data are received.

Such a device may be further operable, following calculation of a hash value, to determine if an entry having an index value equal to such a calculated hash value already stores address information equivalent to the incoming address information, and, if so, to update port information held in that entry, the port information identifying the port of the Ethernet bridge device from which the incoming address information is received, and not to store address and port information in an empty entry of the routing table.

Alternatively, such a device may be further operable, following calculation of a hash value, to determine if an entry having an index value equal to such a calculated hash value already stores address information equivalent to the incoming address information, and, if so, not to store address and port information in an empty entry of the routing table, and to determine if the port information stored at that entry identifies the port of the Ethernet bridge device from which the incoming address information is received, and, if not, to update port information held in that entry.

Such a device may be operable, if none of the routing columns have such an empty entry to determine, and none of the entries of the routing table already store the incoming address information, for a first routing column, the respective hash values for the other routing columns for the address data corresponding to the port data stored in the entry having the index value equal to the calculated hash value, and to determine whether any of the other routing columns has an empty entry for the hash value determined for that column, and, if so, to transfer port data stored in the first routing column to the empty entry of the other routing column, and to store the address and port data in the entry of the first routing column having the index value equal to the calculated hash value, the port data identifying the port from which the address data is received.

The routing unit may be operable to repeat the steps for the first routing column for each other routing column in turn until an empty entry is determined.

The routing unit may also be operable to receive target address data as part of an Ethernet frame, to calculate respective hash values for the routing columns, from the target address data and the respective hash functions, to determine a routing column having a non-empty entry having an index value equal to the calculated hash value for that column, to retrieve port data stored in the determined non-empty entry where address data corresponding to the port data is the same as the target address data, and to transmit the Ethernet frame to the port indicated by the retrieved port data.

In one such a device embodying one aspect of the invention, port information may only be retrieved from the determined non-empty entry if that entry also stores address information equivalent to the target address information.

According to another aspect of the present invention, there is provided a method for storing and retrieving data in a table, the method comprising defining a table having a plurality of storage columns, each of which has a plurality of storage entries with respective associated column index values, defining respective hash functions for the plurality of storage columns, receiving a lookup value, and an associated data value, for each storage column calculating a hash value from the lookup value and the hash function defined for the column, for each storage column, determining if the entry having an index value equal to the calculated hash value is not empty and already stores data for that lookup value or is empty, if the entry already stores data for that lookup value then it is updated, otherwise for those storage columns having such an empty entry, determining a usage value based upon the number of entries in the column in which data are stored, storing the associated data value in the empty entry of the storage column having the highest usage value.

Such a method may also comprise the steps of, following the step of calculating a hash value determining if an entry having an index value equal to such a calculated hash value already stores information equivalent to the lookup value, and, if so, updating a data value held in that entry, and not storing the associated data value in an empty entry of the routing table.

Alternatively, such a method may also comprise the steps of, following the step of calculating a hash value determining if an entry having an index value equal to such a calculated hash value already stores information equivalent to the lookup value, and, if so, not storing the associated data value in an empty entry of the routing table, and determining if a data value stored in that entry is equivalent to the associated data value, and, if not, storing the associated data value in that entry.

Such a method may comprise, if none of the storage columns have such an empty entry, and none of the entries of the table already stores information equivalent to the lookup value, the steps of, for a first storage column, determining the respective hash values for the other routing columns for the data value corresponding to the data value stored in the entry having the index value equal to the calculated hash value, and determining whether any of the other storage columns has an empty entry for the hash value determined for that column, and, if so, transferring data value stored in the first storage column to the empty entry of the other storage column, and storing the data value in the entry of the first storage column having the index value equal to the calculated hash value. Such steps may be repeated for each storage column in turn until an empty entry is determined.

The first storage column may be that storage column having the lowest usage value.

In order to retrieve a stored data value, such a method may comprise further the steps of receiving desired lookup data value, calculating respective hash value for the storage columns, from the desired lookup data and the respective hash functions, determining a storage column having a non-empty entry having an index value equal to the calculated hash value for that column, and retrieving a stored data value from the determined non-empty entry where the lookup value corresponding to the lookup data is the same as the desired lookup value.

Other aspects of the present invention are set out in the attached claims.

BRIEF DESCRIPTION OF THE DRAWINGS

Embodiments of the invention will now be described by way of example only and with reference to the following figures.

DETAILED DESCRIPTION OF THE PREFERRED EMBODIMENTS

Embodiments of the present invention are concerned with the look up of information stored in a database. In such embodiments, a plurality of database columns are provided, each of which has an associated hash function. One particularly suited application of an embodiment of the present invention is that of routing Ethernet frames in an Ethernet computer network, as described above. It will be readily appreciated, however, that the techniques described below embodying various aspects of the present invention could be applied to other applications of data look-up, such as in data cache use, and in particular to CPU data caches.

Figure 3:
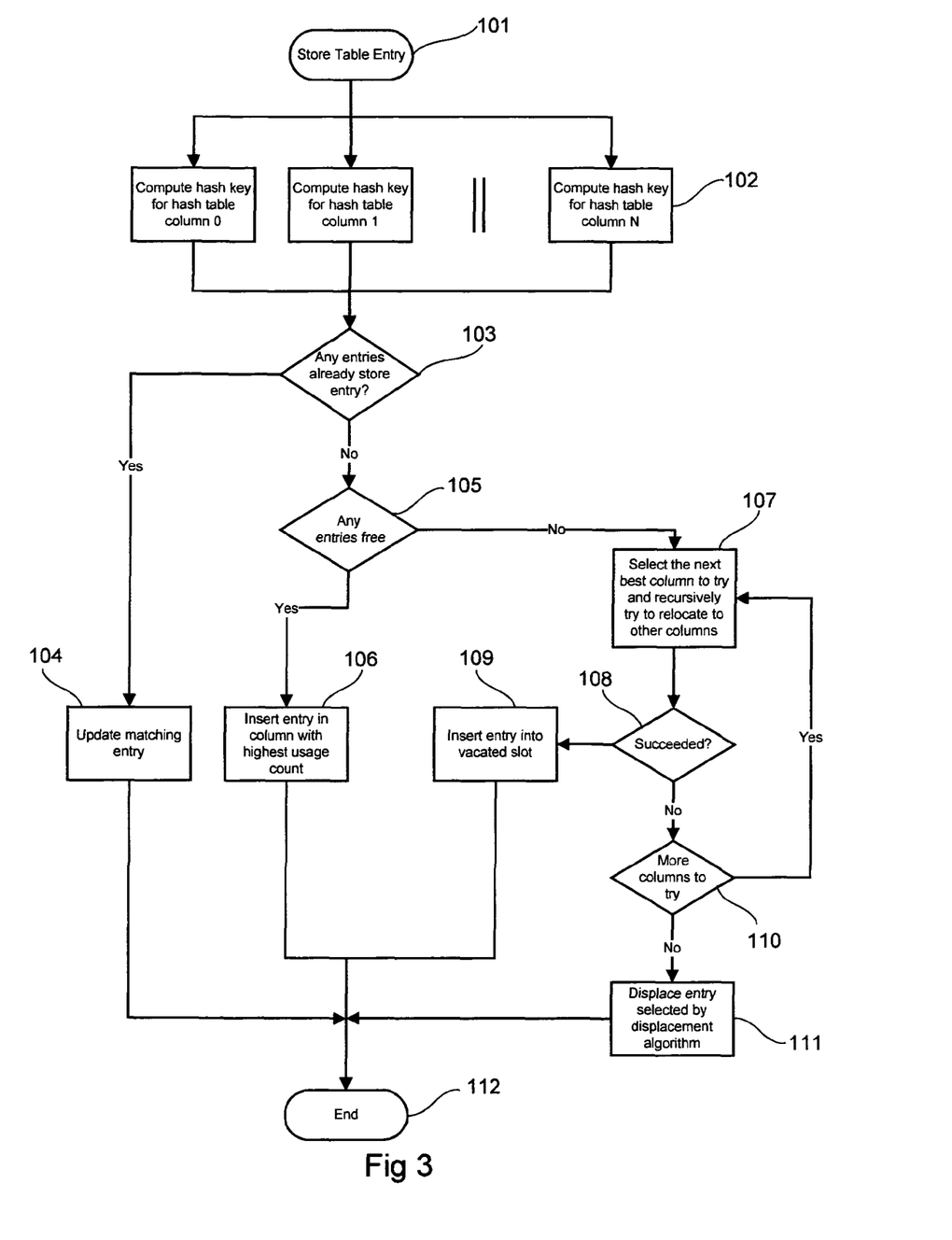
FIG. 3 illustrates steps in a method for storing table entries.

FIG. 3 illustrates steps in a method for storing table entries in a method embodying the present invention. In a technique embodying the present invention, a plurality of hash table columns is provided, each column having an associated hash function with which to calculate the index value. The steps illustrated in FIG. 3 will be described with reference to the routing of Ethernet frames, but it will be readily apparent how the techniques of the present invention may be applied to other data storage applications.

For the routing of Ethernet frames, a forwarding table is defined in which entries are populated with end station information consisting of address information (MAC address and VLAN tag), and port information indicating the port to which the end station is connected. The port information may indicate a single port, a list of ports, a bitmap, or a multicast number which maps to a separately held port list. The VLAN tag information may also be grouped with other VLAN tag information into a filtering identifier (FID), and the FID may be stored in the routing table rather than the VLAN tag itself.

The end station information is preferably stored in the table at a single entry. Alternatively, the address information (MAC address/VLAN tag) may be stored separately from the port information. In the latter case, there is a link provided between the port information and the address information. The address information stored in the table entries can be considered as equivalent to the address information received from the end station in the form of the MAC address/VLAN tag. For example, the stored address information may be the MAC address/VLAN tag itself, or may be a pointer to that information in another storage location, or may be a compressed or encoded form of the MAC address/VLAN tag.

The end station information can be entered into the table either by a learning procedure in which the table is populated as end stations join the network and supply an initial frame or by a software approach when the network topology and devices are known, or by using a dynamic technique, such as using IEEE802.1X port authentication, which allows a station to authenticate itself with the switch management software. When authentication is successful, the software enters the address information and port information into the forwarding database.

FIG. 3 illustrates the learning approach mentioned. Following receipt (step 101) of an Ethernet frame, respective hash values are calculated (step 102) for the routing columns, using respective hash functions and the source information. It is then determined (step 103) whether any of the routing columns already stores data corresponding to the source information. If this is the case, then the port information is updated (step 104) in that column at the entry indicated by the hash value.

However, if the source information is not already stored in the table, it is then determined (step 105) whether any of the routing columns have a free entry for the calculated hash value. If one of the columns has a free entry for the hash value calculated for it, then the source information (address and port data) is stored in that column (step 106) at the index value indicated by the hash value.

If more that one of the columns has a free entry, then the data entry is made in the column having the highest usage count of entries (step 106). The usage count for that column is then incremented.

If, however, none of the columns have a free entry for the calculated hash value, then a conflict resolution technique is employed. In this technique, illustrated in steps 107 to 111 of FIG. 3, the conflicting entry from each column is selected in turn. The order of selection is determined using an algorithm based on the usage count value for each hash column. For example, the order may be that of ascending order of usage count value, or may be descending order of usage count value. For the conflicting entry, the address information stored therein is used to generate respective hash values for the other columns. The entries having index values equal to the corresponding hash values are then accessed to determine whether any of these entries are empty.

If one of the columns has an empty entry, then the conflicting entry is relocated to that column, and that column's usage count is incremented. If more than one column has a free entry, then the conflicting entry is relocated to the column with the highest usage count and the count for that column is incremented. The new entry can then be entered into the now vacant entry in the originally chosen column. Should none of the entries be empty, then the same method is applied recursively a number of times before moving to the next routing column determined using the algorithm based on the value of the usage count. Should it not be possible to relocate any of the conflicting entries in this manner then a forwarding database conflict has occurred and needs to be resolved by one of the common methods for resolving these conflicts.

In an alternative conflict resolution technique, a background process is used to reallocate entries in order to maintain a column or columns as empty as possible.

Figure 4:
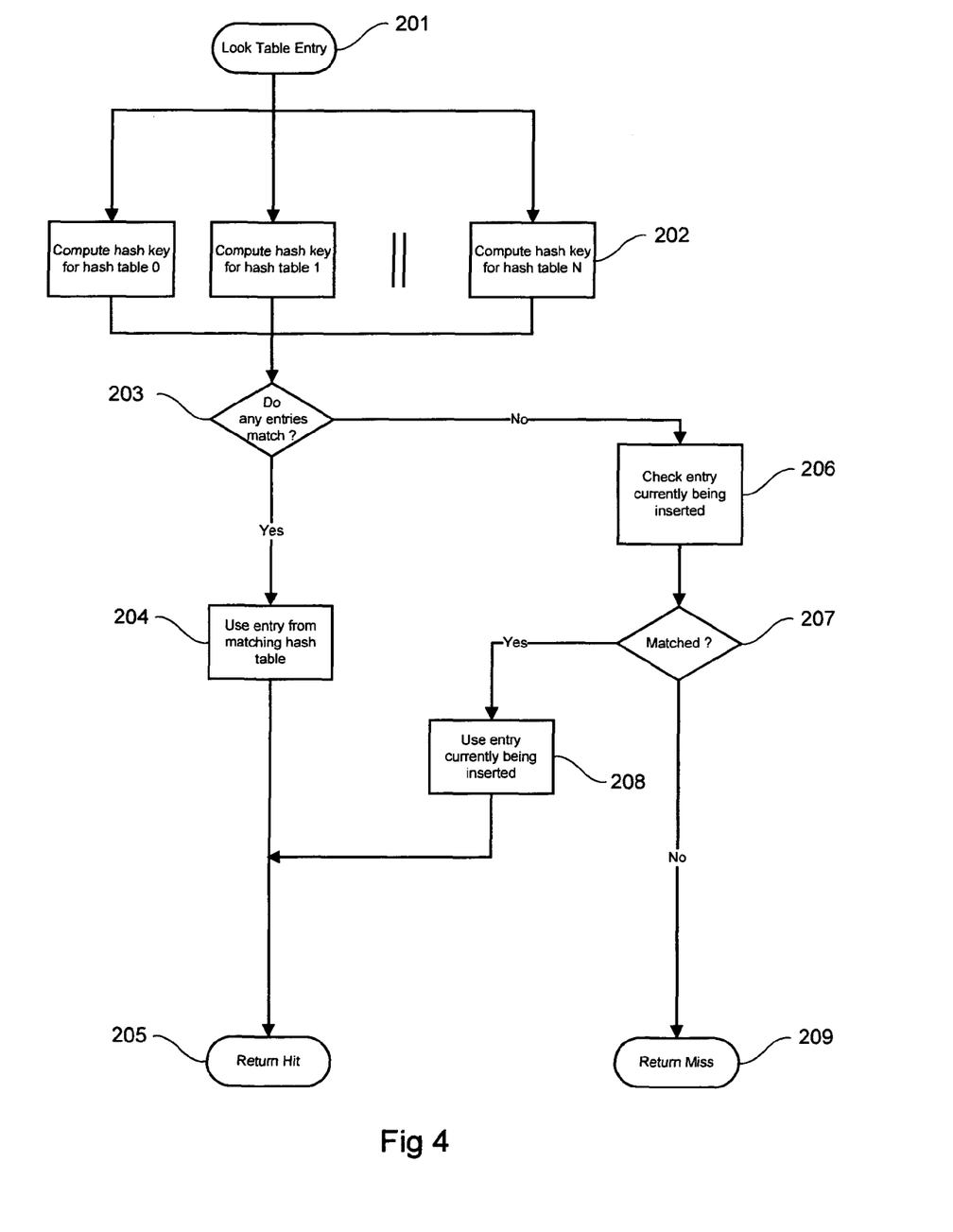
FIG. 4 illustrates steps in a method for retrieving table entries.

FIG. 4 illustrates a table look up technique used in an embodiment of the present invention. In order to look up a table entry, the look up information (destination end station information) is received (step 201) and respective hash values for each of the routing columns are generated (step 202) from the destination address information. These hash values are used to determine the existence of filled entries in the routing columns (step 203). The entries having data stored therein are then checked to determine which of them includes (or points to) the address information relating to the destination. If a matching entry is found, then the port information stored therein is retrieved (step 204).

If none of the routing columns includes an entry for the corresponding hash value, then the value of the currently inserted data is checked, and used if a match is registered (steps 206, 207, 208). If there is no match, however, a miss is returned and the lookup fails.

The techniques embodying the present invention may be applied to applications other than the routing of Ethernet frames. In the general case, lookup key information replaces the destination end station information, and a data value is stored instead of the specific port information.

The operations of the Ethernet bridge 14 "learning" routing information will be described in more detail. The MAC address/VLAN tag information is received in an incoming Ethernet frame for both the source and destination end stations. The source information is used to build up the routing information stored in the forwarding database table columns. From the source information, the plurality of hash values, one per table column, is calculated. These values are then used to determine the column into which the port data relating to the source end station is to be stored. The technique uses the storage steps of FIG. 3, as described above. As an alternative, the routing columns may be populated directly using index values calculated using the respective hash functions associated with the routing columns.

In order to determine the correct port to which the incoming frame should be routed, the destination MAC address/VLAN tag information is used to generate the plurality of hash values corresponding to the plurality of table columns. When a column is found to have an entry corresponding to the hash value (that is, the entry includes information corresponding to the destination information), then the port information stored in that entry is retrieved, since it indicates the port or ports of the bridge 14 to which the frame is to be routed. The bridge 14 then uses the retrieved port information to route the frame correctly.

If none of the columns have the matching entry, then a check is made on the MAC address/VLAN tag which is currently being inserted into the table. If the newly inserted information does match, then it is used for routing of the frame. Otherwise the lookup has failed and a miss occurs.

The techniques of the present invention can be applied to the retrieval of information from a lookup table which stores a moderate number of objects from a very large object space (MAC addresses are a good example of such a space). In particular, the retrieval of routing information for Ethernet frames is suitable for using these techniques. In addition, the retrieval of data from a cache, for example a CPU cache, could also make use of techniques embodying the present invention.

A cache in general stores a relatively small number of values from a much larger value range. In the case of a processor it consists of two parts—the cache lines which store the data being cached, and the cache tags which store the "address" of the data (which might also comprise a MMU context, segment values or other tags) caches tend to be direct mapped set associative caches—this means that the cache tags are directly indexed by a subset of the "address" and then all tags on that line are compared to see if a match occurs. If so, the relevant cache line data is used. If not then if a free entry was found then that entry is used, otherwise one entry is selected to be displaced and any data present may need to be written back to memory from where it will be fetched again later.

Dependant on the range of "addresses" being used, then the cache could behave badly if the level of associativity is insufficient, and in this case many cache misses would occur with the penalty that the CPU access time would be increased and this would likely lead to the application running slower.

In this respect the tag mechanism of a CPU cache is similar to the frame routing application described above. The techniques embodying the present invention can, therefore, be directly applied to the CPU cache tags with the benefit that the cache would become less sensitive to the range of "addresses" and so application performance would become more predictable.

The invention claimed is:

1. A method of routing Ethernet frames between ports of an Ethernet bridge device, the method comprising the steps of:

defining a routing table having a plurality of routing columns, each column having a plurality of entries, and each entry in a column having a unique index value;

defining respective hash functions for the routing columns;

receiving incoming address information from a port of the Ethernet bridge device;

for each routing column:

calculating a hash value from the incoming address information and the hash function defined for the column;

determining if an entry having an index value equal to such a calculated hash value is empty;

for those routing columns having such an empty entry: determining a usage value based upon the number of entries in the column in which data are stored; and storing address and port information in the empty entry of the routing column having the highest usage value, the port information identifying the port of the Ethernet bridge device from which the incoming address information is received.

2. The method of claim 1, further comprising, following the step of calculating a hash value:

determining if an entry having an index value equal to such a calculated hash value already stores address information equivalent to the incoming address information, and, if so, updating port information held in that entry, the port information identifying the port of the Ethernet bridge device from which the incoming address information is received, and not storing address and port information in an empty entry of the routing table.

3. The method of claim 1, further comprising, following the step of calculating a hash value:

determining if an entry having an index value equal to such a calculated hash value already stores address information equivalent to the incoming address information, and, if so, not storing address and port information in an empty entry of the routing table, and determining if the port information stored at that entry identifies the port of the Ethernet bridge device from which the incoming address information is received, and, if not, updating port information held in that entry.

4. The method of claim 1 further comprising, if none of the routing columns have such an empty entry, and none of the entries of the routing table already store information equivalent to the incoming address information, the steps of:

for a first routing column:
determining the respective hash values for the other routing columns for address information stored in the entry having the index value equal to the calculated hash value;

determining whether any of the other routing columns has an empty entry for the hash value determined for that column, and, if so, transferring address and port information stored in the first routing column to the empty entry of the other routing column, and storing the address and port information in the entry of the first routing column having the index value equal to the calculated hash value, the port information identifying the port from which the address information is received.

5. The method of claim 4, wherein the steps are repeated for each routing column in turn until an empty entry is determined.

6. The method of claim 4, wherein the first routing column is that routing column having the lowest usage value.

7. The method of claim 1, further comprising the steps of:
receiving target address information as part of an Ethernet frame;
calculating respective hash values for the routing columns, from the target address information and the respective hash functions;
determining a routing column having a non-empty entry having an index value equal to the calculated hash value for that column;
retrieving port information stored in the determined non-empty entry; and transmitting the Ethernet frame to the port or ports indicated by the retrieved port information.

8. The method of claim 7, wherein port information is only retrieved from the determined non-empty entry if that entry also stores address information equivalent to the target address information.

9. An Ethernet bridge device comprising:
a plurality of ports for reception and transmission of Ethernet frames;
a routing unit for directing an Ethernet frame received at an ingress port of the device to an egress port of the device, wherein the routing unit is operable:
to define a routing table having a plurality of routing columns, each column having a plurality of entries, and each entry in a column having a unique index value;
to define respective hash functions for the routing columns;
to receive incoming address information from a port of the Ethernet bridge device;
to calculate, for each routing column, a hash value from the incoming address information and the hash function defined for the column; and
to determine, for each routing column, if an entry having an index value equal to such a calculated hash value is empty;
to determine, for those routing columns having such an empty entry, a usage value based upon the number of entries in the column in which data are stored; and
to store address and port information in the empty entry of the routing column having the highest usage value, the port information identifying the port of the Ethernet bridge device from which the address information is received.

10. The device of claim 9, further operable, following calculation of a hash value:
to determine if an entry having an index value equal to such a calculated hash value already stores address information equivalent to the incoming address information, and, if so, to update port information held in that entry, the port information identifying the port of the Ethernet bridge device from which the incoming address information is received, and not to store address and port information in an empty entry of the routing table.

11. The device of claim 9, further operable, following calculation of a hash value:
to determine if an entry having an index value equal to such a calculated hash value already stores address information equivalent to the incoming address information, and, if so, not to store address and port information in an empty entry of the routing table, and to determine if the port information stored at that entry identifies the port of the Ethernet bridge device from which the incoming address information is received, and, if not, to update port information held in that entry.

12. The device of claim 9, further operable, if none of the routing columns have such an empty entry, and none of the entries of the routing table already store the incoming address information:
to determine, for a first routing column, the respective hash values for the other routing columns for address information stored in the entry having the index value equal to the calculated hash value;
to determine whether any of the other routing columns has an empty entry for the hash value determined for that column, and, if so, to transfer address and port information stored in the first routing column to the empty entry of the other routing column, and to store the address and port information in the entry of the first routing column having the index value equal to the calculated hash value, the port information identifying the port from which the address information is received.

13. The device of claim 12, wherein the first routing column is that routing column having the lowest usage value.

14. The device of claim 9 wherein the routing unit is operable:
to receive target address information as part of an Ethernet frame;
to calculate respective hash values for the routing columns, from the target address information and the respective hash functions;
to determine a routing column having a non-empty entry having an index value equal to the calculated hash value for that column;
to retrieve port information stored in the determined non-empty entry; and
to transmit the Ethernet frame to the port or ports indicated by the retrieved port information.

15. The device of claim 14, wherein port information is only retrieved from the determined non-empty entry if that entry also stores address information equivalent to the target address information.

16. A method for storing and retrieving data in a table, the method comprising:
defining the table having a plurality of storage columns, each of which has a plurality of storage entries with respective associated column index values;
defining respective hash functions for the plurality of storage columns;
receiving a lookup value, and an associated data value;
for each storage column, calculating a hash value from the lookup value and the hash function defined for the column;
for each storage column, determining if the entry having an index value equal to the calculated hash value is empty;
for those storage columns having such an empty entry, determining a usage value based upon the number of entries in the column in which data are stored; and
storing the associated data value in the empty entry of the storage column having the highest usage value.

17. The method of claim 16, further comprising, following the step of calculating a hash value:
determining if an entry having an index value equal to such a calculated hash value already stores information equivalent to the lookup value, and, if so, updating a data value held in that entry, and not storing the associated data value in an empty entry of the routing table.

18. The method of claim 16, further comprising, following the step of calculating a hash value:
determining if an entry having an index value equal to such a calculated hash value already stores information equivalent to the lookup value, and, if so, not storing the associated data value in an empty entry of the routing table, and determining if a data value stored in that entry is equivalent to the associated data value, and, if not, storing the associated data value in that entry.

19. The method of claim 16, further comprising, if none of the storage columns have such an empty entry, and none of the entries of the table already stores information equivalent to the lookup value, the steps of:
for a first storage column:
determining the respective hash values for the other routing columns for the data value corresponding to the data value stored in the entry having the index value equal to the calculated hash value;
determining whether any of the other storage columns has an empty entry for the hash value determined for that column, and, if so, transferring data value stored in the first storage column to the empty entry of the other storage column, and storing the data value in the entry of the first storage column having the index value equal to the calculated hash value.

20. The method of claim 16, further comprising the steps of:
receiving desired lookup data;
calculating respective hash values for the storage columns, from the desired lookup data and the respective hash functions;
determining a storage column having a non-empty entry having an index value equal to the calculated hash value for that column; and
retrieving a stored data value from the determined non-empty entry.

* * * * *